March 18, 1947.  T. F. ARONSON  2,417,539
FLEXIBLE DRILL JIG
Filed Jan. 20, 1944  2 Sheets-Sheet 1
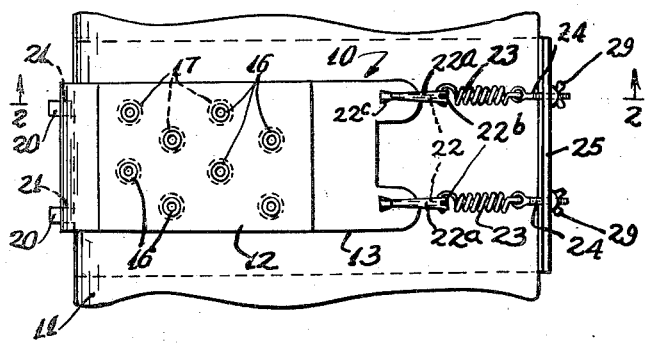
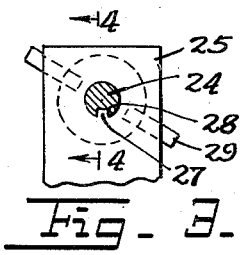
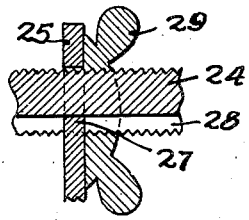
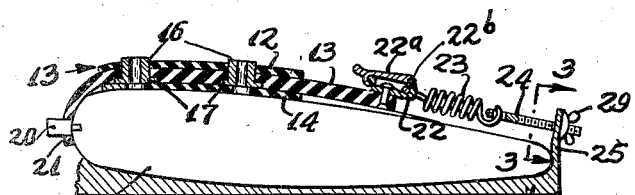
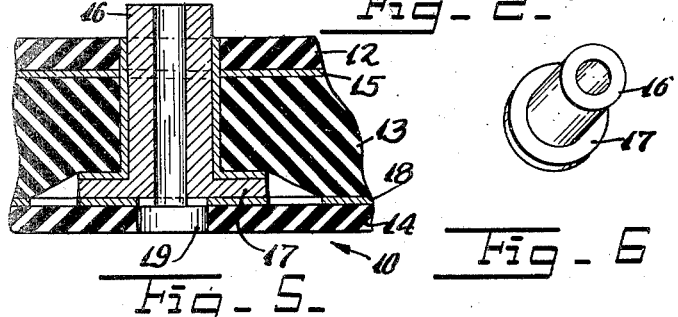
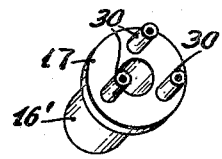
INVENTOR.
*Theodore F. Aronson*
BY *Zoltan Holecsek*
ATTORNEY March 18, 1947.  T. F. ARONSON  2,417,539
FLEXIBLE DRILL JIG
Filed Jan. 20, 1944  2 Sheets-Sheet 2
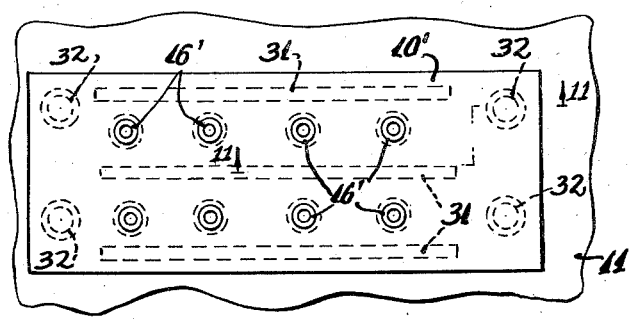
Fig_10_
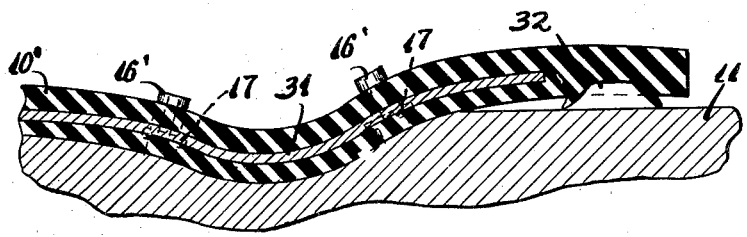
Fig_11_
INVENTOR.
Theodore F. Aronson
BY
Zoltan H. Polachek
ATTORNEY Patented Mar. 18, 1947

2,417,539

UNITED STATES PATENT OFFICE 2,417,539

FLEXIBLE DRILL JIG

Theodore F. Aronson, New York, N. Y.

Application January 20, 1944, Serial No. 518,948

4 Claims. (Cl. 77—62)

This invention relates to new and useful improvements in a flexible drill jig.

More specifically, the invention proposes the construction of a flexible drill jig adapted to be used on curved surfaces, and more specifically designed for use in constructing riveted airplane structures such as wings, fuselage, etc., in a manner to permit the holes in the skin and frame to be conveniently drilled simultaneously and substantially perpendicular to the curved surface at that point for the reception of the rivets used in securely attaching the skin to the frame.

Still further it is proposed to characterize the flexible drill jig by a flexible sheet adapted to be secured in position upon a curved surface and which is provided with strategically located drill guiding bushings mounted therethrough in a manner to guide the drill bit.

Still another object of the invention proposes the provision of adjustable fastening elements arranged to be used for holding a flexible sheet in a stretched condition on a piece of work to be drilled.

Still another object of the invention proposes the provision of pliable means for holding the flexible sheet in position within a negative curve to permit the drill jig to be used on surfaces of irregular configurations.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a partial plan view of an airplane wing provided with a flexible drill jig constructed in accordance with this invention.

Fig. 2 is a vertical sectional view taken on the line 2—2 of Fig. 1.

Fig. 3 is a vertical sectional view taken on the line 3—3 of Fig. 2.

Fig. 4 is an enlarged vertical sectional view taken on the line 4—4 of Fig. 3.

Fig. 5 is an enlarged detailed view of a portion of Fig. 2.

Fig. 6 is a perspective view, per se, of one of the drill guide bushings used in the first form of the invention.

Fig. 7 is a view similar to Fig. 5 but illustrating a modification of the invention.

Fig. 8 is a bottom plan view of Fig. 7.

Fig. 9 is a bottom perspective view of the drill guide bushing used in the form of the invention shown in Fig. 7.

Fig. 10 is a plan view of a flexible drill jig constructed in accordance with a modification of this invention.

Fig. 11 is a partial longitudinal vertical sectional view taken substantially on the line 11—11 of Fig. 10.

The flexible drill jig, according to this invention, includes a flexible sheet 10 which is adapted to be mounted in position upon a surface 11 which is to be drilled. The flexible sheet 10 is in this case constructed of several layers 12, 13 and 14 of rubber material having their adjacent faces securely attached together by means of cement or other suitable bonding methods.

Drill guide bushings 16 are positioned at strategic locations in the flexible sheet 10. These bushings 16 are specifically located with relation to the position at which it is desired to provide the material being worked upon with holes. Each of the drill guide bushings 16 is provided with an enlarged head 17 which is secured in position between the layers 13 and 14 of the flexible sheet 10 by means of cement or other suitable bonding methods. The bottommost layer 14 of the flexible sheet 10 is provided with an opening 19 arranged concentric with the opening of the bushing 16 for permitting the free passage of the drill bit. When the flexible sheet 10 is in position on the work surface 11, as shown in Figs. 1 and 2, the bushing 16 may be used to properly guide a drill bit to provide the surface with desired strategically located holes.

The enlarged heads 17 of the bushings 16 form substantially a tangent to the curved surface which is being drilled.

Fastening elements are provided for securing the flexible sheet 10 in position upon the article 11 being worked upon. This means comprises studs 20 engageable with the edge of the material 11 and the adjacent end of the flexible sheet 10 is provided with openings 21 engageable with the studs 20. The opposite end of the flexible sheet 10 has secured thereto metallic pieces 22 which have projected ends engaged with springs 23. A snap locking latch 22ª is hinged at 22ᵇ and permits the removal of spring 23 when the locking latch 22ª is swung into open position by pulling on its handle 22ᶜ when the latch 22ª is closed, the spring pressure will always be the same, therefore once the jig and spring pressure is adjusted, the latch 22ª will lock the jig into place and insure the same pressure and position at all times.

The opposite ends of the springs 23 are attached to screws 24 which pass through a flange 25 projecting from a support base 26. The flange 25 is provided with keys 27 which engage corresponding keyways 28 formed in the screws 24. The engagement of each key 27 with the keyway retains the screws 24 against turning relative to the flange 25 while permitting them to slide freely longitudinally relative thereto.

Thumb nuts 29 threadedly engage the screws 24 and bear against the back faces of the brackets 25 for tensioning the spring 23 to securely extend the flexible sheet 10 in a stretched condition upon the article 11 to be drilled.

The manner of using this form of the invention is as follows:

The flexible sheet 10 is first positioned upon the piece of work 11 which is to be drilled. This is accomplished by engaging the openings 21 of the flexible sheet 10 with the studs 20. The clamps 25 are then engaged upon the back edge of the piece of work 11. The thumb nuts 29 are then rotated to draw upon the screws 24 and tension the springs 23. Tensioning the spring 23 will cause the flexible sheet 11 to be drawn into a proper stretched condition over the surface of the piece of work to be drilled. The bushings 16 will then be in a position on the surface of the article 11 to properly guide a drill bit to form strategically located openings in the article 11.

The flexible drill jig is designed to be used on any curved surface, but it is particularly useful in drilling holes in an airplane wing or fuselage skin and frame through which the rivets are adapted to be engaged for securely mounting the skin in position upon a wing or fuselage frame. In Figs. 1 and 2 the flexible drill jig is shown in position on a wing surface for this purpose.

In the modification of the invention shown in Figs. 7, 8 and 9 the flexible sheet 10' is formed of a single layer of flexible rubber material and has the bushing 16' moulded directly into the material thereof. In this form of the invention the bottom face of the head 17 of the bushing 16' is provided with three outwardly extending aligning pins 30. These pins 30 are adapted to seat themselves on the surface of the article being drilled to properly extend the openings of the bushings 16' at right angles to the bit area engaged by the bushings 16'.

In the modification of the invention shown in Figs. 10 and 11 the construction of the flexible drill jig is similar to that shown in Figs. 7 and 8 except that the flexible sheet 10' has molded into the length thereof pliable metallic strips 31. These pliable metallic strips permit the flexible sheet 10' to be bent into the configuration of the negative curves for properly aligning the bushings 16' and heads 17 with the surface of these negative curves to permit the bushings to be used to drill holes at right angles to the surface of these negative curves. The pliable metallic strips 31 are preferably lengths of sheet metal or other similar pliable material which will retain a position into which it is bent.

The form of the invention is also provided with a slightly different means for mounting the flexible sheet 10' in position on the surface of the article which is being worked upon. In this form of the invention the ends of the flexible sheet 10' are provided with suction cups 32 which are adapted to be engaged upon the surface of the article 11.

It is to be understood that the flexible drill jig may be made of any suitable material, size and shape for guiding the drill at the desired angle.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A flexible drill jig, comprising a flexible sheet, drill guiding bushings mounted through said sheet, and fastening elements for holding said flexible sheet in a stretched condition on a piece of work to be drilled, said flexible sheet being constructed of superimposed rubber layers and means for securing said layers together.

2. A flexible drill jig, comprising a flexible sheet, drill guiding bushings mounted through said sheet, and fastening elements for holding said flexible sheet in a stretched condition on a piece of work to be drilled, said flexible sheet being constructed of superimposed rubber layers and means for securing said layers together, said bushings having head secured in position between certain of said layers.

3. A flexible drill jig, comprising a flexible sheet, drill guiding bushings mounted through said sheet, and fastening elements for holding said flexible sheet in a stretched condition on a piece of work to be drilled, said fastening elements comprising openings formed in one end of said flexible sheet and engageable with studs mounted on said piece of work and tensioning means for securing the other end of said flexible sheet in position in a stretched condition.

4. A flexible drill jig, comprising a flexible sheet, drill guiding bushings mounted through said sheet, and fastening elements for holding said flexible sheet in a stretched condition on a piece of work to be drilled, said fastening elements comprising openings formed in one end of said flexible sheet and engageable with studs mounted on said piece of work and tensioning means for securing the other end of said flexible sheet in position in a stretched condition, said tensioning means comprising releasable springs and a latch for locking the said springs in position at a predetermined tension.

THEODORE F. ARONSON.

REFERENCES CITED

The following references are of record in the file of this patent:

UNITED STATES PATENTS

| Number | Name | Date |
| --- | --- | --- |
| 2,039,105 | Naery | Apr. 28, 1936 |
| 2,284,929 | Stewart | June 2, 1942 |
| 2,050,985 | Trickey | Aug. 11, 1936 |
| 2,279,636 | Mueller et al. | Apr. 14, 1942 |
| 1,897,495 | Pecker | Feb. 14, 1933 |

OTHER REFERENCES

American Machinist, July 9, 1942, pp. 731-738, Pub. by McGraw-Hill Pub. Co., 330 W. 42d St., New York, N. Y.